April 13, 1926.
J. R. SAYLOR
THREADING DIE
Filed May 18, 1925
1,581,023
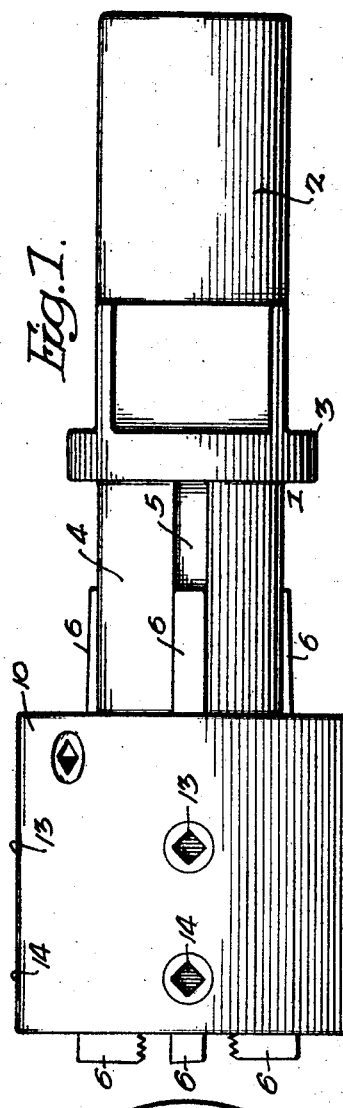
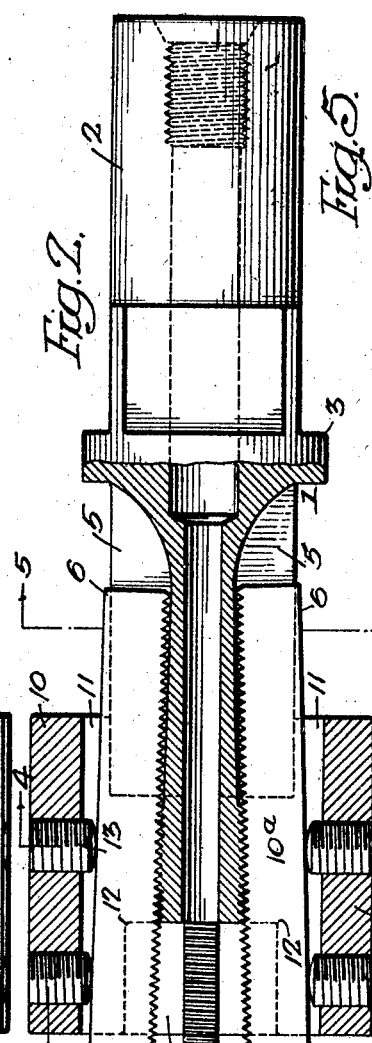
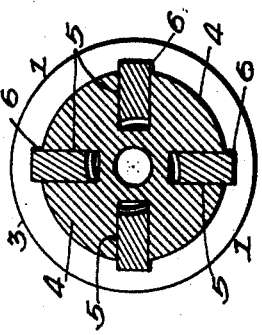
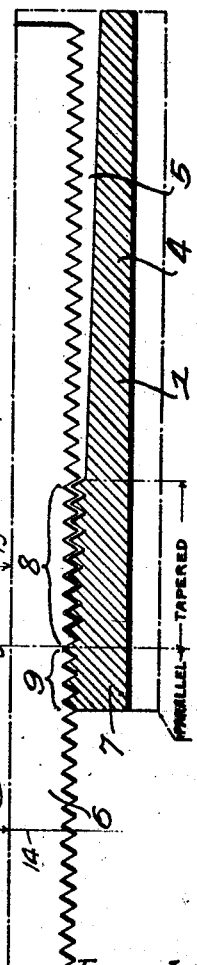
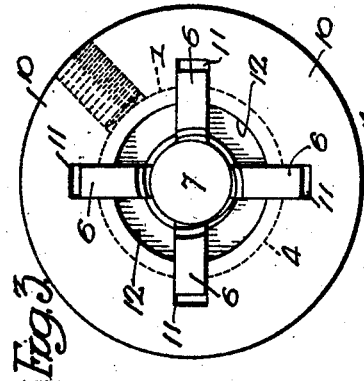
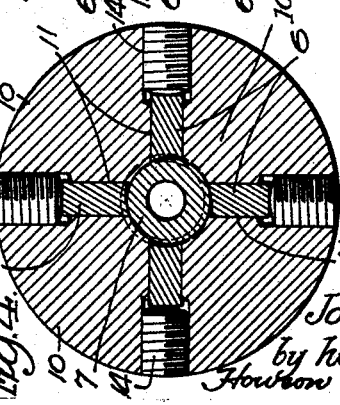
Inventor:
John R. Saylor.
by his Attorneys,
Howson & Howson Patented Apr. 13, 1926.

1,581,023

UNITED STATES PATENT OFFICE.

JOHN R. SAYLOR, OF POTTSTOWN, PENNSYLVANIA.

THREADING DIE.

Application filed May 18, 1925. Serial No. 31,112.

*To all whom it may concern:*

Be it known that I, JOHN R. SAYLOR, a citizen of the United States, residing in Pottstown, Montgomery County, Pennsylvania, have invented certain Improvements in Threading Dies, of which the following is a specification.

My invention relates to certain improvements in dies for cutting screw threads upon pipes, rods, &c.

The object of the invention is to construct a threading die in such a manner that the chasers can be locked in position by one set of screws and can be adjusted to take up for wear without releasing the chasers from engagement with the threaded body portion.

In the accompanying drawings:

Fig. 1 is a side view of my improved die;

Fig. 2 is a longitudinal sectional view;

Fig. 3 is an end view;

Fig. 4 is a transverse sectional view on the line 4—4, Fig. 2;

Fig. 5 is a transverse sectional view on the line 5—5, Fig. 2; and

Fig. 6 is a diagram showing the relation of the adjusting screws and the locking screws in respect to the screw threaded stem.

The body 1 of the die has a portion 2, which is adapted to be secured in any type of threading machine. On the body 1 is a flange 3. Beyond the flange is a slotted portion 4. The longitudinal slots 5 in the portion 4 are of a width to receive the rear ends of the chasers 6. On the end of the body 1, beyond the slotted portion 4, is a threaded projection 7. A portion 8 of this projection is tapered and a portion 9 is of an even diameter. A shell 10 has a portion 10ª shown by dotted lines in Fig. 2 and in Fig. 4. In this portion is a threaded opening into which is screwed the threaded projection 7. The shell has longitudinal internal slots 11 in line with the slots in the body portion.

The chasers 6 fit the slots 11, as shown in Fig. 4, and are held against lateral movement. The threads cut in the chasers engage the threads on the projection 7, and are held against longitudinal movement by said projection.

The opening in the front of the shell is enlarged, as at 12, to allow clearance for the chips and to allow for a certain amount of adjustment for the chasers. The chasers 6 are locked to the projection 7 of the body 1 by locking screws 13, which bear against the back edges of the chasers, as shown in Figs. 2 and 4. The screws are preferably on a line *x*, directly back of the point *y*, where the tapered portion 8 of the projection 7 merges in the portion 9 of even diameter, Fig. 6.

In front of the locking screws 13 are adjusting screws 14, which bear upon the back edges of the chasers near the front of the die, as shown in Fig. 2. By this construction, the chasers can be moved towards or from each other by manipulating the adjusting screws 14. The chasers rock to a certain extent on the threaded projection 7.

When the two screws of each chaser are properly adjusted, the chasers are held firmly in the body portion and shell. By backing off both screws 13 and 14, a chaser can be readily removed from the die, or can be adjusted longitudinally therein.

When a chaser is located in a die, and its thread is in engagement with the thread of the body, then it is in proper alignment with the other chasers and the locking screw can be turned until the chaser is firmly held.

The adjusting screw 13 can be turned until the outer end of the chaser is in position to cut a thread.

It will be seen from the improvements hereinbefore described that the adjustments of the chasers can be made without disturbing their connection with the body portion. By backing off the screw 13, the chasers can be adjusted longitudinally, or they can be removed without changing the cutting adjustment.

I claim:

1. The combination in a threading die, of a slotted body portion having a threaded projection; a slotted shell secured to the body portion and enclosing the threaded projection; a series of chasers mounted in the slots of the body and shell and engaging the threads on the projection; and two sets of screws, one set locking the chasers to the body, and the other set being arranged to adjust the chasers towards and from the center of the die.

2. The combination in a threading die, of a body portion having a series of longitudinal slots therein and having a threaded extension; a shell secured to the body and having longitudinal slots aligning with those of the body; chasers located in the slots of the body and the shell, the threads of the chasers engaging the thread on the extension of the body; a locking screw for each chaser in line with the threaded extension of the body; and an adjusting screw for each chaser near the outer end of the shell.

3. The combination in a threading die, of a body having a series of longitudinal slots therein and having an extension, said extension having a section of even diameter and having a tapered section, said sections having a screw thread thereon; a shell secured to the body and enclosing the threaded extension, said shell having longitudinal slots in line with those of the body; chasers mounted in the slots; locking screws in the shell arranged to bear upon the back of the chaser in a line with the tapered portion of the projection of the body; and adjusting screws in the shell bearing on the chasers in front of the locking screws.

JOHN R. SAYLOR.